UNITED STATES PATENT OFFICE.

DAVID E. BREINIG, OF NEW YORK, N. Y., ASSIGNOR, BY MESNE ASSIGNMENTS, TO ANNA S. BREINIG, CHARLES TAYLOR, AND JOHN H. WELLES.

IMPROVEMENT IN TREATING LINSEED AND OTHER OILS FOR PAINTS, &c.

Specification forming part of Letters Patent No. 61,653, dated January 29, 1867; reissue No. 4,557, dated September 19, 1871

*To all whom it may concern:*

Be it known that I, DAVID E. BREINIG, of the city, county, and State of New York, have invented a new and Improved Vehicle for Paint; and I do hereby declare the following to be a full, clear, and exact description thereof, which will enable those skilled in the art to make and use the same.

This invention consists in a metalline gum prepared of a strong alkali, linseed-oil or its equivalent, and nitrate of lead or copper, or sulphate of zinc. The invention also consists in a compound of an insoluble soap or metalline gum with linseed or other oils or fat, and with or without turpentine, benzine, or other liquids of a similar nature, in such a manner that a vehicle for paint is obtained which materially increases the durability of the paint, and particularly the quality, to withstand the influence of atmospheric changes. The invention consists, finally, in a compound produced by mixing the metalline gum and linseed-oil with spirits of turpentine or benzine.

In preparing the metalline gum, I take fifty-six pounds of a strong alkali, such as caustic soda or potash, dissolve it in forty-eight gallons of water, either by the aid of dry or of steam heat, and to this solution I add twenty-eight gallons of linseed-oil, or cotton-seed oil, or of any drying oils, or their equivalents in fats. This mixture I boil until the ingredients are united to soap. I then take nitrate of lead or copper, or sulphate of zinc, or any equivalent metallic salt in a solution of 24° Beaumé and mix this solution with the soap prepared as above stated in such proportion that the nitric or sulphuric acid of the metal salt will combine with the alkali of the soap, leaving the fatty acid of the soap combined with the metallic oxide, (of zinc, lead, or copper,) as the compound which I term "metalline gum." This metalline gum I mix with linseed or other oils or fats in the following manner: I take two hundred and fifty pounds of gum and place it in a tank or vat provided with a steam-coil, so that the gum can become heated. As soon as the gum is melted I add thereto fifty gallons of raw linseed-oil and boil the mass for two hours. By these means a vehicle for paint is obtained which can be used with great advantage. After the compound of two hundred and fifty pounds of metalline gum and fifty gallons of linseed-oil has been prepared as above stated, I add to the same one hundred and thirty gallons of spirits of turpentine or benzine, or part of each, and stir it for half an hour, and then let it stand until it has cleared itself, and finally draw off the clear liquid and barrel it ready for the market. For heavy or double-boiled oil, for oil-cloth manufacturers, I take fifty pounds of metalline gum, fifty gallons of linseed-oil, six pounds of binoxide of manganese, twenty pounds of litharge, and twenty-six gallons of spirits of turpentine or benzine, or part of each. I place the gum in a vat and melt as before. I place the linseed-oil, manganese, and litharge in another tank and boil it for four hours; I then draw it off and place it in the vat to the gum and boil it again for two hours; I then add the spirits of turpentine or benzine and let it cool, and finally barrel it for use. For printers' ink I use seventy-five pounds of gum and prepare in the same manner as the double-boiled oil. For varnish I place the clear oil (either single or double-boiled) in a still and distil over all the spirits of turpentine or benzine, and then draw off the residuum into suitable vessels, and let it stand uncovered, to absorb the oxygen from the air, eight days; I then add spirits of turpentine sufficient so it will flow easy under the brush. In some cases I add borate of manganese, to produce a quick-drying varnish. Instead of linseed-oil other quick-drying oils, such as cotton-seed oil, may be substituted in the above process, or quick-drying properties may be imparted to other oils or fats by means of oxidizing agents and then such oils or fats may be substituted for linseed-oil.

I do not confine myself strictly to the proportions above given, since the same may be varied for various purposes.

What I claim as new, and desire to secure by Letters Patent, is—

1. A compound obtained by treating linseed-oil or its chemical equivalent with an alkali, and exposing the product to the action of a solution of sulphate of zinc, or its chemical equivalent, substantially as described.

2. A compound obtained by treating the metalline gum hereinbefore described with linseed-oil or its chemical equivalent, substantially in the manner set forth.

3. A compound obtained by treating the above-named mixture of linseed-oil and metalline gum with spirits of turpentine or benzine, substantially in the manner described.

This specification signed by me this 18th day of August, 1871.

D. E. BREINIG.

Witnesses:
W. HAUFF,
E. F. KASTENHUBER.

(77.)